May 18, 1965 P. D. KASPAR 3,184,357
METHOD OF LAMINATING SHEATHS
Filed March 6, 1962
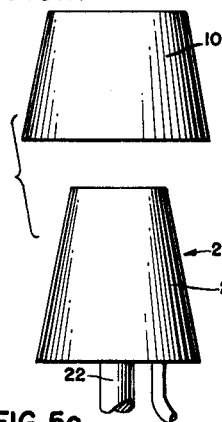
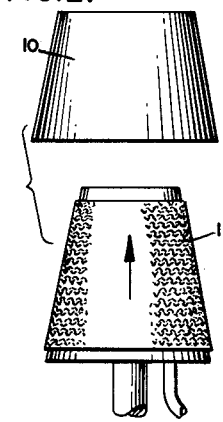
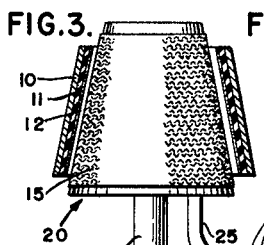
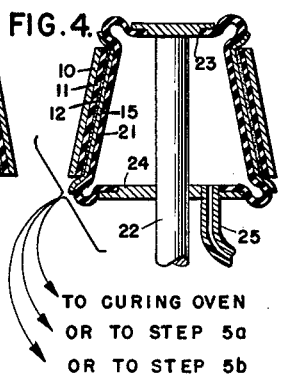
TO CURING OVEN
OR TO STEP 5a
OR TO STEP 5b
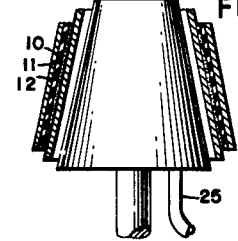
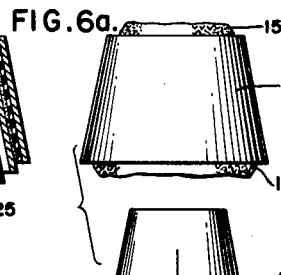
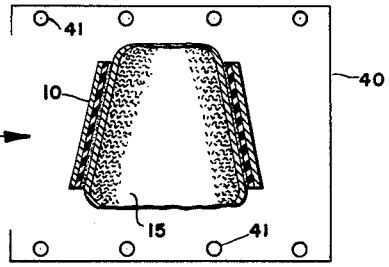
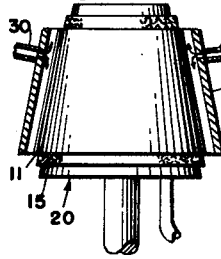
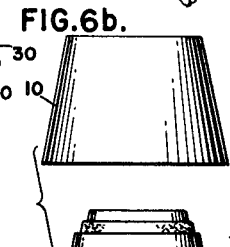
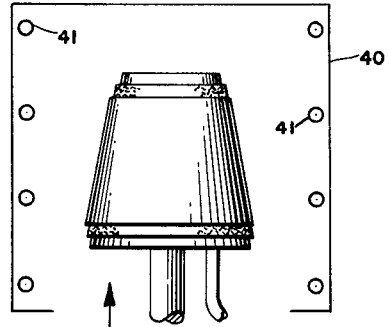
INVENTOR
Peter D. Kaspar
BY 
ATTORNEY

United States Patent Office 3,184,357
Patented May 18, 1965

3,184,357
METHOD OF LAMINATING SHEATHS
Peter D. Kaspar, Dover, Del., assignor to International Latex Corporation, Dover, Del., a corporation of Delaware
Filed Mar. 6, 1962, Ser. No. 177,769
10 Claims. (Cl. 156—165)

This invention is an improved method of making a seamless rubber girdle having a stretchable fabric lining.

A girdle made of a seamless rubber sheath having a stretchable fabric lining adhesively integrated to it has superior qualities. Its rubber sheath component gives the smooth constriction and supple control of body contours characteristic of rubber girdles, while the fabric lining provides the comfort and better feel of a cloth girdle. The use of a stretchable lining throughout the girdle enables one to choose lining materials which either serve as just a fabric for skin contact or serve to provide a substantial part of the control function of the girdle. The fact that the rubber sheath is seamless, and in some embodiments the stretchable fabric lining is also seamless, makes the garment more comfortable, makes it last longer, and avoids or reduces the welting of the body and the wrinkling of the garment which seams produce.

In co-pending application Serial No. 91,218, and continuation-in-part thereof Serial No. 170,314, there is disclosed a method of applying a seamless stretchable lining to a seamless rubber sheath, in which the lining is applied onto the then outer surface of the rubber sheath.

The present invention is specific to an inside-application method. This is of particular advantage when used with a method of forming the rubber sheath which ends up with the sheath situate upon the inner surface of a hollow, or shell, form. Another invention, not claimed herein, teaches so making the rubber sheath for special reasons. While a sheath so made could be reversed onto another holder and the lining then applied to the outside, the present invention provides a method especially adapted and advantageous for lining a sheath which is deposited on the inside of a hollow form.

The new method uses an air bladder, shaped generally like the hollow form upon whose inner surface the rubber sheath lies. The bladder is however somewhat smaller in diameter throughout than the corresponding portions of the shell form. A stretchable sleeve, which will constitute the lining, is placed upon the outer surface of the bladder. The rubber sheath is given a thin coating of elastic adhesive suitable for bonding the sleeve to the sheath; alternatively or in addition, the fabric sleeve can be coated with adhesive.

Then the bladder is advanced into concentric relationship within the form. Fluid pressure (using liquid or gas, but preferably compressed air) is exerted on the interior of the hollow expansible bladder. Thus the stretchable sleeve is enlarged and forced into contact with the inner surface of the sheath. The travel of the sleeve, as contact with the surface of the sheath is made, is essentially perpendicular to its surface. Sufficient dwell is given, while the fluid pressure in the bladder is maintained, that the sleeve sticks to the sheath.

Thereafter the invention involves alternative procedures. One, preferred as to the precision of its products but not as to its cost, is to leave the bladder expanded and to place the form, bladder and lined rubber sheath all together in curing environment, such as an oven, to cure the adhesive. This permits further handling of the article. The entire article can be partially or completely cured at this stage if desired. After this, the bladder and form are separated and the lined sheath is stripped off.

Alternatively the form and bladder may be separated before the curing or partial curing step. The adhesive is set or partially set by air drying, heat, or otherwise, while the bladder is still expanded in contact with the lining on the sheath, to create an adhesive bond between the sheath and lining. Then the fluid pressure in the bladder is released, and the bladder contracts while leaving the sleeve sticking to the rubber sheath and the rubber sheath still in place on the inside surface of the hollow form. Then the hollow form and the composite article on it are placed in an oven or other suitable environment where the article is cured, or partially cured so it can be stripped from the form and further handled without impairing it.

Again alternatively, the bladder may be somewhat contracted and the sheath with its bonded lining be stripped from the shell form and stay with the bladder. Then the bladder, carrying the lined rubber sheath, is placed in an oven or other environment to cure the article, or partially cure it so it can be stripped from the bladder and can be handled further without impairing it.

The method of the invention will be described with the aid of the annexed drawings, which are mainly diagrammatic and not intended to limit the invention to the embodiments shown, and in which:

FIGS. 1 and 2 are elevations of the form and of the bladder below it, FIG. 2 showing the sleeve positioned on the bladder.

FIG. 3 shows the bladder having been advanced axially to a spaced concentric position within the form. The form and the rubber sheath it carries on its inside surface are shown in vertical section.

FIG. 4 shows both the form and the bladder in section, the bladder having been inflated and pressing the sleeve against the sheath.

After the step shown in FIG. 4, the whole assembly may be sent to a curing oven or series "a" or series "b" may be followed in the alternative.

FIG. 5a shows the bladder in elevation and the form in section, the bladder having been deflated, the sleeve sticking to the sheath and both remaining on the form.

FIG. 6a shows the bladder axially retracted from the form, both being shown in elevation.

FIG. 7a shows the form, bearing the sheath with lining adhesively secured to it (these being shown in section) moved to a curing environment.

FIG. 5b shows the bladder inside the form and having been deflated and carrying the sleeve and sheath on it. Illustrative means for causing the sheath to strip from the form are indicated herein. The bladder is shown in elevation and the form in section.

FIG. 6b shows the bladder bearing the lined sheath having been retracted axially from the vacated form.

FIG. 7b shows the bladder, carrying the lined sheath, moved to a curing environment.

The form 10 is, or approximates, a figure of revolution and is hollow. As seen in FIGURE 3, a rubber sheath 11 is deposited upon its inner wall surface. The form may be cylindrical, frusto-conical as shown in the drawings, or otherwise shaped, including shapes having compound curvature. The form and bladder move relative to each other. Preferably, the bladder is moved and the form is held stationary by suitable mounting or holding means (not shown) which leaves at least one, preferably the larger, open end of the hollow form unobstructed for insertion of the bladder.

The bladder 20 comprises the bladder wall, or elastic membrane, 21, and associated means which include a stem, post or arm 22, top and bottom end plates 23 and 24 respectively, or their functional equivalents. A flexible tube 25 or other suitable means connects the bladder to a source of variable fluid pressure such as a two-way valve selectively leading to a compressed air source or venting to the atmosphere.

A stretchable lining is, in a representative embodiment, a sleeve 15 (FIGURE 2) cut from a continuously made circular knit tube of fabric having the proper stretch characteristics. The fabric is preferably knit from yarn which is itself stretchable, such as Helanca yarn.

The sleeve in its rest condition is smaller than the bladder. It is manually or otherwise stretched over the bladder as shown in FIGURE 2, which stretching makes it substantially free from wrinkles when in position on the bladder. Both the bladder 20 and the sleeve 15 are preferably somewhat longer than the rubber sheath 11 and the form 10, and a final trimming operation of the sleeve will remove any excess extending beyond the edges of the sheath.

A layer 12 of suitable adhesive (FIGURE 3) is placed upon the exposed face of the rubber sheath on the form. Desirably, this adhesive is a layer of latex or equivalent elastic adhesive. The adhesive is allowed to partially dry to whatever semi-fluid consistency is appropriate to its nature, before the sleeve is pressed into contact with it.

The bladder 20 bearing the sleeve 15 is advanced axially into concentric relation within form 10 which has the rubber sheath 11 on its inner surface. Then fluid pressure sufficient to expand membrane 21 to the extent required is developed inside the bladder. The extending membrane 21 stretches the sleeve 15 and presses it smoothly and uniformly into contact with the adhesive layer 12 on the surface of the rubber sheath. The fluid pressure inside the bladder is maintained, and the bladder held stationary in relation to the form for a sufficient dwell period so that the lining may penetrate properly into the adhesive layer on the sheath, and become adhered to the sheath sufficiently to permit separation of the bladder and the form without delaminating the lining from the sheath.

The fluid pressure within the bladder is controlled so that the pressure exerted by the membrane 21 of the bladder achieves a depth of penetration of the lining into the adhesive layer as is appropriate to the nature of the adhesive, its semi-fluid state, and the nature and thickness of the lining sleeve. It will be noted that, because the bladder is actuated by fluid pressure, the force per square inch of surface every where throughout the article will be uniform. This can be modified by variations in the bladder. For example, the bladder can be compartmented and greater pressure can be developed at certain parts of the girdle, such as the stomach area, where less elasticity is desired. The greater pressure forces the lining more deeply into the adhesive layer. This reduces stretch by adhesively bonding together some or all of the loops in the knit structure of the lining in those parts.

It will also be noted that the lining moves into contact with the adhesive layer on a generally perpendicular path, with virtually no tangential component to the travel. This is true not only for the cylindrical form, but also the frusto-conical form. Greater initial expansion of the larger diameter of the frusto-conical form brings the lining into contact with the adhesive layer first, thereby causing contact to creep up in a wave, with contact being made perpendicularly everywhere. Thus, the method of the invention avoids wiping some parts of the sheath surface bare and piling up excess adhesive in other parts, which would give undesirable irregularity of bonding strength and permit delamination of the lining in weak bond areas. When the bladder has pressed the lining the adhesive layer, from that point on any of three alternative procedures may be followed.

One procedure, designated in FIGURE 4 by the words "To Curing Oven," leaves the bladder expanded in contact with the lining, and the entire assembly of form, bladder and lined rubber sheath is placed in a suitable oven, or is otherwise heated to partially set or cure the adhesive, and if desired partially or completely cure the rubber sheath itself. Thereafter the bladder is deflated by reducing the fluid pressure in it, and the sheath with the lining bonded to it is stripped off the surface on which it remains.

The procedure illustrated in the "a" series of the drawings (FIGURES 5a, 6a and 7a) is as follows: The adhesive is dried, by air evaporation or with heat, sufficiently to cause the lining to be adhered to the sheath. The bladder is deflated by releasing the pressure through suitable valving means (not shown). The elastic membrane 21 of the bladder pulls back to its original rest position, leaving the sleeve adhesively applied to the surface of the rubber sheath on the form and now integrated to it as its lining. The bladder when deflated is radially clear of the lining, and is now withdrawn axially from within the form.

The form carrying the lined rubber sheath is advanced into an oven 40 with heating pipes 41, or other suitable heating environment for such degree of complete or partial curing as is desired at this time. It will be understood that a finished girdle, apart from any desired trimming operations, attaching of accessories, or the like, can be made at this time. For example, if the form had compound curvature, giving the shaped desired in the finished girdle, the curing in the oven could be a complete and final cure for the rubber sheath as well as the elastic adhesive by which its lining is integrated to it.

An alternative procedure is illustrated in the "b" series of the drawings (FIGURES 5b, 6b and 7b).

The dwell under fluid pressure which forces the lining into the adhesive is maintained long enough that the adhesive bond sets up stronger than the degree of adhesion between the rubber sheath and the form. The bladder is partially deflated and the rubber sheath with its integrated lining is caused to come off of the form onto the bladder. The parting of the sheath from the form surface may be assisted, if necessary, by air pressure applied between the sheath and form surface by compressed air lines 30 shown in FIGURE 5b, or by suitable vacuum means, or by use of a parting compound to provide a low degree of adhesion between the form surface and the rubber sheath. The bladder carrying the lined sheath is introduced into an oven 40 with heating pipes 41, or other suitable environment for such curing or partial curing of the girdle as may be desirable at that time.

*Rubber or latex.*—The term "rubber" or "latex" as used herein includes all elastomers and aqueous dispersions thereof suitable for use in the present invention, for example polyurethane, poly-cis-isoprene (synthetic natural), butadiene rubbers, carboxylic elastomers, and other synthetic rubbers, as well as natural rubber.

*Depositing the latex.*—The latex may be deposited upon the form in several successive layers to constitute the body of the rubber sheath, and the final layer may be deposited thereon to constitute the adhesive layer, by any suitable means, including dipping or spraying. In either case a solution of rubber in a solvent may be used in place of a dispersion of rubber in water.

*The adhesive layer.*—This layer has been referred to as latex, and it desirably is latex of the same composition as the body of the rubber sheath. However a different latex composition or a different suitable elastic adhesive material may be used to constitute the surface layer for securing the lining to the sheath. Preferably the adhesive layer is deposited on the rubber sheath as has been described, but it could be deposited on the adjacent surface of the sleeve, or two adhesive components could be deposited, one on each of those two surfaces.

*The sleeve.*—The sleeve when it is to constitute the lining of the girdle is a stretchable or elastic fabric. It may be, and preferably is, a seamless tubular sleeve of circular knit fabric having longitudinal as well as circumferential stretch, such for example as Helanca. However, it may be a seamed sleeve of elastic fabric, preferably having two-way stretch, such as power net made from rubber cored yarn with textile thread covering. In the latter case, the lining may contribute significantly to the control function of the garment.

The sleeve is made with a rest diameter smaller than the sheath to permit smooth fit by having the sleeve slightly stretched when mounted on the bladder and expanded to press against the sheath. The stretch characteristics of the sleeve as a bonded lining are set forth in co-pending application Serial No. 91,218.

It should be emphasized that the method of the invention is broadly applicable to elastically bonding two or more stretchable sheaths into a stretchable laminated sheath. Consequently, the sleeve may be any stretchable or elastic sheath, including a rubber sheath of the same or different character as the sheath on the form to which it is to be laminated by this method.

*Perforations.*—The rubber sheath of the girdle may be, and desirably is, provided with a large number of perforations. These may be made in the article after the lining has been attached to the rubber sheath, or they may be formed in the rubber sheath before the lining is attached.

Alternatives or modifications in addition to the foregoing will be apparent to those skilled in the art and are to be regarded as within the scope of the invention as defined by the following claims.

I claim:
1. Method of applying a stretchable sleeve to the exposed surface of a rubber sheath positioned upon the inner surface of a hollow form which comprises placing said sleeve upon an inflatable bladder adapted to fit within said form, applying a layer of adhesive to at least one of the surfaces to be joined, inserting the bladder carrying the sleeve within the form to place the sleeve in spaced relation adjacent to said sheath, inflating the bladder thereby enlarging the stretchable sleeve and pressing it into contact with the sheath with the adhesive layer therebetween, and maintaining this relation until the enlarged sleeve is adhered to the sheath.

2. Method of claim 1 in which at least the adhesive layer is set with the bladder pressing the sleeve into the adhesive layer.

3. Method of claim 1 in which the bladder is retracted from the form, and the lined sheath is carried entirely by one of those two members, and the member carrying the lined sheath is introduced into an environment for curing at least the adhesive layer.

4. Method of claim 3 in which the bladder when deflated moves inwardly away from the lined rubber sheath, which remains on the form.

5. Method of claim 3 in which the lined rubber sheath is transferred to the bladder from the form when the bladder is separated from the form.

6. Method of claim 1 in which the hollow form is frusto-conical with at least the larger end open and the bladder is of similar shape, and the bladder is moved axially in through the open larger end of the form into position everywhere close to but not contacting the rubber sheath, whereupon axial motion ends and the bladder is inflated to enlarge radially.

7. Method according to claim 1 in which the inflation of the bladder causes the sleeve to move substantially perpendicularly into contact with the sheath through the contact area therebetween.

8. Method according to claim 1 in which the sleeve is a stretchable fabric.

9. Method according to claim 1 in which the sleeve is a rubber sheath.

10. Method of applying a seamless stretchable fabric lining to a seamless rubber girdle sheath which comprises positioning a rubber sheath with an adhesive exterior layer on the inside surface of an open ended hollow form, mounting a tubular sleeve of seamless knit fabric upon an inflatable bladder adapted to fit within said form, placing the bladder carrying the sleeve within the form, with the sleeve and adhesive layer adjacent but spaced, and inflating said bladder to stretch and to press the sleeve into said adhesive layer under controlled pressure to adhere the stretched sleeve as a lining on said sheath.

References Cited by the Examiner
UNITED STATES PATENTS

| | | | |
|---|---|---|---|
| 1,713,751 | 5/29 | Dorogi et al. | 156—287 |
| 2,838,435 | 6/58 | Hewett | 156—285 |

EARL M. BERGERT, *Primary Examiner.*